Patented Aug. 7, 1951

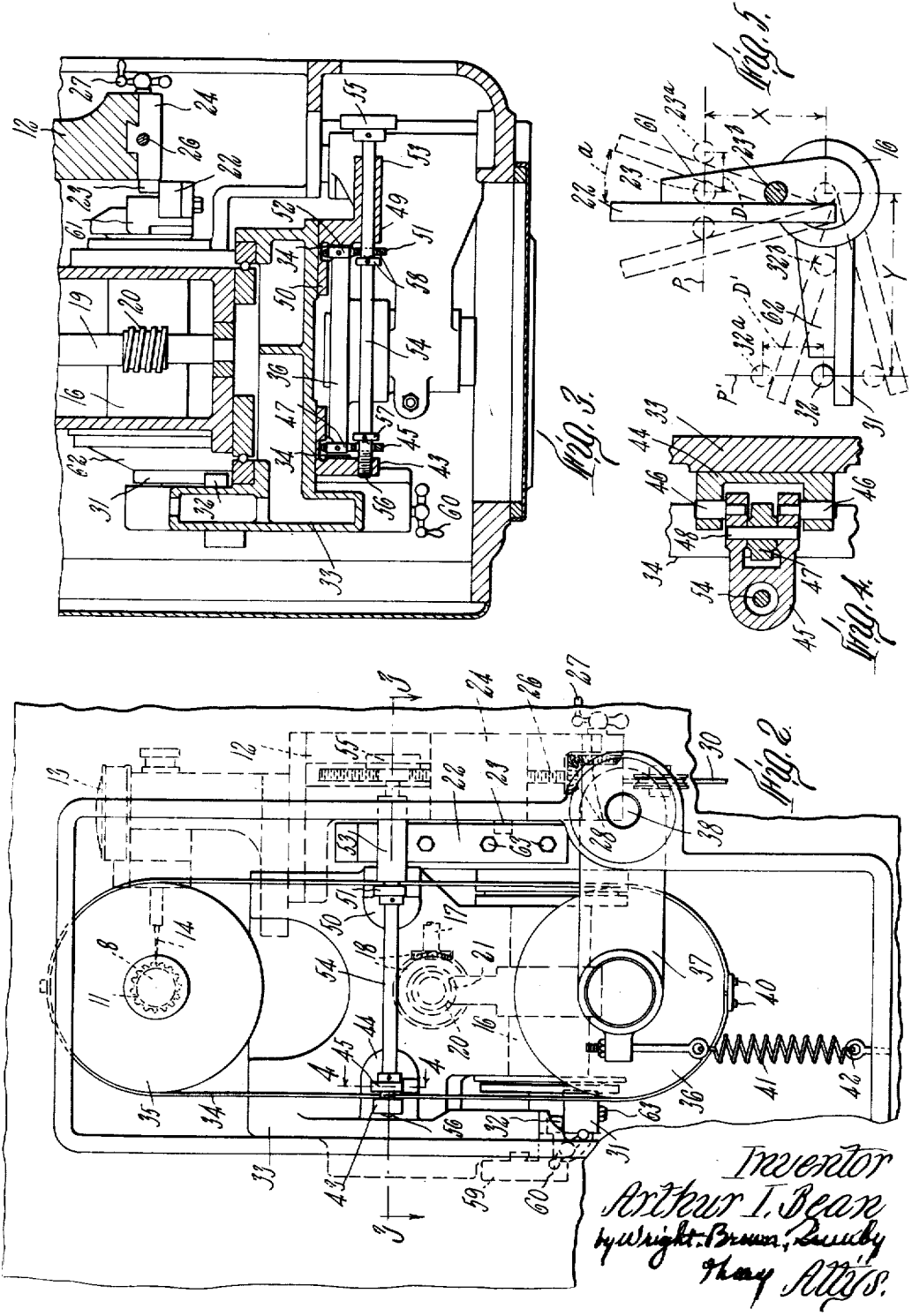

2,563,000

UNITED STATES PATENT OFFICE 2,563,000

LEAD MEASURING MACHINE

Arthur I. Bean, Springfield, Vt., assignor to The Fellows Gear Shaper Company, Springfield, Vt., a corporation of Vermont Application March 2, 1945, Serial No. 580,538

13 Claims. (Cl. 33—179.5)

The purpose of the present invention is to provide a machine by which the leads of helical and other spiral curves may be tested and the errors therein detected and measured. It is also a part of the object to enable a record to be made of the truth and errors of such curves. Further objects are to provide adjustments to permit measuring a wide range of leads and to provide means for measuring either right hand or left hand leads.

The principles of the invention include means by which a testing instrument, with which a multiplying indicator or recorder is associated, is caused to move in a path corresponding to one of the components of the curve being measured, while the article in which the curve exists is moved in proportion to the other component of the curve. One principal field of utility for the invention is for measuring the leads of helices, such as those of helical gears, worms, screws, etc. These curves have an axial component and a circular or rotative component, and the principles of the invention include means by which the piece having the curved surface is rotated about the axis of the helix, while the measuring or indicating instrument is moved in the direction of such axis at a rate of speed that bears the same ratio to the speed of rotation of the piece that the axial component bears to the circular component of the curve. The embodiment chosen for illustration of the invention herein is designed for measuring helices of which the pitch surface is a cylinder, but the same principles are applicable to the testing and measurement of other spirals of which the ratio between the circumferential and axial components is not uniform.

In the drawings:

Fig. 2 is a partial end elevation of the machine as seen from the left of Fig. 1;

Fig. 3 is a sectional plan view of the machine taken on line 3—3 of Fig. 2;

Fig. 4 is a detail sectional view taken on line 4—4 of Fig. 2;

Fig. 5 is a diagrammatic view of the ratio bars and pins by which motion is transmitted at any prescribed ratio to the indicating instrument and the piece being tested.

Like reference characters designate the same parts wherever they occur in all the figures.

Figure 1:
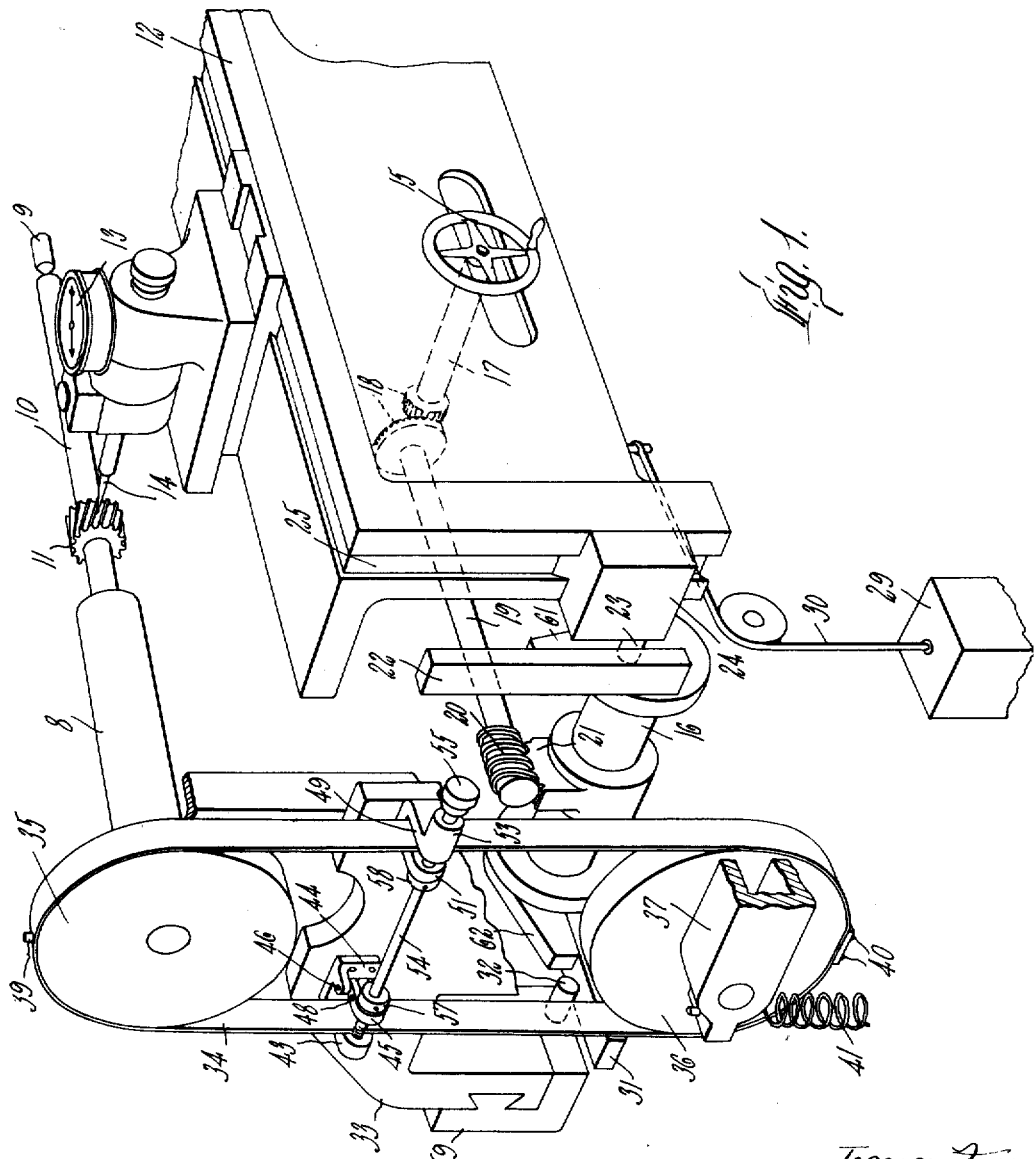
Fig. 1 is a schematic perspective view of the essential parts of a lead testing and measuring machine embodying the invention.

The machine base or supporting structure, which may be of any suitable construction, supports a head stock in which a spindle 8 is rotatably mounted, and a tail stock carrying a dead center 9. The head and tail stocks are not here shown, nor are all the details of the supporting structure or base, for these may be of any suitable character and design according to principles well known in the art of machine tools. The spindle 8 carries a live center, not shown, between and by which, and the dead center 9, an arbor 10 carrying a helical gear 11 may be placed and mounted. Any one of a wide variety of objects having helical curves may be thus mounted, as will be readily understood by all skilled in the art.

A carriage or slide 12, which I call a measuring slide, is mounted on the supporting structure for linear movement in a path parallel to the axis of the arbor. It is guided by ways, not shown, of known character, of accurate form and accurately located with respect to the head stock and tail stock. A measuring instrument 13 is mounted on the slide 12 with provision for adjustment lengthwise and crosswise thereof, in known manner, as illustrated by Fig. 1. This instrument has a finger or feeler 14 which projects toward the axial line of the test piece and is capable of movement in directions transverse to its length and is coupled through multiplying mechanism with an indicating hand or pointer organized to rotate over a dial and measure such movements of the pointer with large multiplication of the amplitude thereof. Such instruments are well known and are standard equipment for many kinds of measuring apparatus, wherefore the details of the instrument 13 need not be here described. It is sufficient for the present explanation to say that the indicating hand or element moves proportionally to lateral displacements of the extremity of the feeler finger.

Movement is imparted to the measuring slide or carriage 12 by a hand wheel 15 which drives a shaft 16 through a shaft 17, a gear couple 18, a shaft 19, a worm 20 on shaft 19, and a gear segment 21 on shaft 16 meshing with the worm. Shaft 16 carries an arm 22 which I call a ratio bar, one side of which engages a pin 23 connected with the carriage 12 for applying impelling force thereto. Shaft 16 is mounted with its axis perpendicular to a line parallel to the axis of spindle 8 and center 9, and perpendicular also to a line parallel to the path of the carriage 12. The face of the ratio bar which bears on the pin 23 is straight and is offset from the axis of shaft 16 by a distance equal to the radius of the pin in such manner that it is parallel to the common plane of the axes of shaft and pin. The pin is adjustable on the carriage in a path perpendicular to the carriage path and to the shaft 16 through a range which enables it to be placed in alinement with the shaft axis and at any distance therefrom within the length of the ratio bar. It is carried by a block or pin slide 24 which occupies a guideway 25 in the end of the carriage, and is adjustable along said guideway by a screw 26 rotated by a hand crank 27 through gears 28. A weight 29 connected with the carriage by a cable 30, substantially as shown by Fig. 1, exerts constant yielding force on the carriage maintaining the ratio pin in contact with the ratio bar.

Shaft 16 carries a second ratio bar 31, the function of which is to exert force in a manner such as to transmit rotary movement to the spindle 8 and the test piece. It acts through a ratio pin 32 to move a traveler or drive slide 33 in a path which is perpendicular both to the axis of spindle 8 and to the path of the measuring slide. With the arrangement here shown, where the spindle 8, shaft 16, and measuring slide path are all horizontal, the path of the drive slide 33 is vertical, whereby gravity maintains its ratio pin against the bar 31 and causes it to move downwardly when the bar is lowered. But it will be understood that the machine could be arranged in such manner that gravity is not effective thus to actuate the drive slide, and in that case a weight, such as that applied to the measuring slide, or a spring, would be applied to the drive slide.

The face of bar 31 which bears on the ratio pin 32 is straight and is offset from the axis of shaft 16 by a distance equal to the radius of pin 32 and in such manner that it is parallel to the common plane of the axes of shaft and pin. Adjusting means, later described, enable this pin to be put in axial alinement with the shaft and at various distances from the axis thereof. The two ratio bars and ratio pin are alike in principle, and the bars are set at an angle to one another equal to that between the paths of the two slides; that is, 90° in the case here illustrated.

To distinguish the bars from one another by name, the bar 22 may be called the linear component bar, because it imparts linear movement to the measuring instrument, and bar 31 may be called the angular component bar, because it imparts angular movement to the test piece. The ratio pins 23 and 32 may be distinguished by similar names.

Motion is transmitted from the slide 33 to shaft 8 by a tape 34 which passes around a driving disk 35 fast on spindle 8, and around an idle pulley or disk 36 carried by an arm 37, which is pivoted to the machine frame at 38 on an axis parallel to those of the spindle and the two disks. The tape is made fast to disk 35 at the upper side of the latter by a stud 39 and its ends are brought together beneath the disk 36 and made fast thereto by studs 40. It is made of material having minimum capacity for stretching under light loading, such as steel, and is maintained under tension by a spring 41 coupled to the arm 37 and to an anchorage 42 on the machine frame so that it exerts force constantly on disk 36 away from disk 35.

The two stretches of tape 34 pass between two pairs of fixed and movable clamps carried by the drive slide 33, either of which may be tightened and the other simultaneously loosened. One pair of clamps consists of a lug 43 on a bracket 44, which is secured to the slide 33, an arm 45 coupled by pivots 46 to the bracket and a jaw piece 47 coupled to the arm 45 by a pivot 48. The other pair of clamps consists of a lug 49 on a bracket 50 which is secured to the slide, arm 51 and jaw piece 52, similar to the clamp pair first described, with the exception that the lug 49 carries a bearing 53 for a clamp operating shaft 54. Shaft 54 carries a knob 55 at the end which protrudes from the bearing 53, and its opposite end 56 is threaded into the lug 43. It carries collars 57 and 58 at the inner sides of the arms 45 and 51, respectively. Thus, when the shaft is screwed to the left, (with reference to these drawings), the clamp jaw 47 presses the contiguous stretch of the belt against the adjacent face of lug 43; and when it is screwed to the right, jaw 52 clamps the other stretch of the belt against the contiguous surface of lug 49. When either clamp is thus closed on the tape, the other one is opened.

The angular component ratio pin 32 is adjustable horizontally, that is, in a direction transverse to the movement of drive slide 33, from a position in alinement with the shaft 16, or approximately so, to different positions throughout the length of its associated ratio bar 31. It is carried by a subslide or pin slide 59 occupying a guideway on the slide 33 and is adjusted by a handle 60 connected to a screw which is not shown, but which is similar to the screw 26 and is meshed with threads in the pin slide.

It will be apparent from the foregoing that when the operating hand wheel 15 is rotated, the carriage or measuring slide 12 and the drive slide 33 are shifted in their respective paths simultaneously, provided the ratio pins are located at any point out of exact alinement with the axis of shaft 16. Depending on the direction in which the shaft rotates, the slides are so shifted by force applied by the ratio bars, or by gravity to the extent permitted by receding movement of these bars. Rotation is transmitted to the test piece by tape 34 in either right hand or left hand rotation while the drive slide 33 moves in one direction, according as one or the other clamp jaw 47 or 52 is set up against the tape. The ratio of movements imparted to the two slides is proportional to the ratio of the distances from the axis of shaft 16 of the paths in which the respective ratio pins travel.

The truth of the last statement is demonstrable as follows. Referring to the diagram in Fig. 5, assume that the ratio bars are rotated clockwise from the positions shown by full lines in that figure, wherein the bar 22 is perpendicular to the path P of the measuring slide and bar 31 is perpendicular to the path P' of the pin 32, through an angle $a$, with consequent shifting of pin 23 to the position 23a and of the pin 32 to the position 32a. Let D represent the distance traveled by the axis of the pin 23 and D' the distance traveled by the axis of pin 32; and let X and Y designate the distances of the paths P, and P' respectively, from the axis of the shaft. The angle around the axis of the shaft between the two positions of the pin 23, and that between the two positions of the pin 32, are both equal to the angle $a$.

Hence $$\frac{D}{X} = \tan a \quad \text{and} \quad \frac{D'}{Y} = \tan a$$

Therefore $$\frac{D}{X} = \frac{D'}{Y} \quad \text{and} \quad \frac{D}{D'} = \frac{X}{Y}$$

The same demonstration applies to movements in either direction from the position in which the ratio bars are perpendicular to the paths of pin travel, wherefore the total distances through which the slides can move within the range of control of the ratio bars are proportional to the distances X and Y. These latter distances can be given any value by adjustment of the ratio pins as previously described, and as illustrated by the circles 23b and 32b in Fig. 5 representing different positions of the pins. Conditions essential to accuracy in the ratios of travel in all adjustments of the pins are that the angle between the bars be equal to that between the paths of the slides and that each bar be set off from the axis of the shaft 16 by a distance equal to the radius of its cooperating pin. But these angles can be other than a right angle, and the two pins need not have the same radius.

Preliminary to making a test, the ratio pins are set in accordance with the prescribed components of a given curve so that the measuring instrument will be moved linearly at a rate proportional to the prescribed lead while the test piece is rotated through a prescribed angle; and the measuring instrument is adjusted so that its feeler finger bears against the curved surface being tested. Then, as the movements of the parts occur, parts of the surface being tested which deviate from accuracy cause the extremity of the feeler to be shifted laterally and its displacements to be indicated.

It is part of my intention to record the indications of the feeler, and for that purpose I may use means substantially like those shown in the patent of Stuart G. Leonard No. 2,305,264, December 15, 1942, for Electrical Apparatus for Indicating and Recording the Characteristics of Surfaces. A marking instrument is there disposed to inscribe a line on a traveling record sheet, and controlled by a feeler to be shifted transversely of the direction of travel of the sheet in proportion to lateral displacements of the feeler. The record sheet may be propelled by mechanism driven by either of the slides, and including a reversing gear; all substantially in accordance with the principles of said Leonard patent.

For convenience of manufacture, the ratio bars 22 and 31 are connected to the shaft 16 by means of arms 61 and 62, respectively, which are made fast to the shaft and to which the bars are secured by bolts 63. Preferably one of the arms is made adjustable around the axis of the shaft, or both arms may be so adjustable, in order to make the angle between the bars exactly correct and compensate for possible errors in the angle between the planes of the guideways for the two slides, and other possible errors.

The principles of the invention are applicable for testing other curves and curved surfaces than those previously indicated, such as the faces of tapered worms, spiral bevel gears, and others of which the rotative and linear components are at other than right angles. In machines provided for such purposes, the paths of the slides are relatively disposed correspondingly to the components of the curve, and the ratio bars disposed at like angles to one another.

From this explanation it will be apparent that various more or less extensive changes can be made from the specific design and construction shown in these drawings without departing from the principles and scope of the invention. Hence the descriptive terms used in the claims are to be construed as embracing equivalent parts and constructions, and not according to limiting definitions except where the context requires. Thus, for instance, with reference to the ratio bars and pins, the bars are essentially arms and the pins are abutment elements arranged to bear on such arms. The abutment elements also need not be complete cylindrical pins, and the arcuate face of either pin need subtend only an angle as large as that through which the arms are adapted to swing. In one extreme case, the abutment may have a V edge arranged to engage the ratio bar or arm. That is, it may have zero radius at the contact point. Otherwise there is no limit except practical convenience to the radius of either abutment. In all except the limiting case, the radius of the curved surface which bears on the ratio arm is uniform in any plane perpendicular to the axis of curvature.

What I claim and desire to secure by Letters Patent is:

1. A machine for testing leads, which comprises a supporting structure, slides mounted with provision for linear movement on said supporting structure in paths which make an angle to one another corresponding to that between the linear and angular components of a three dimensional curve, two ratio arms in rigid association mounted to turn about an axis transverse to the directions of movement of both said slides, said arms being spaced about their axis of rotation with an angle between them equal to that between the directions in which the slides are constrained to travel, abutments on the respective slides each arranged to engage one of said ratio arms, a spindle mounted on the supporting structure so connected with one of said slides as to be rotated when that slide is displaced, and a measuring instrument carried by the other slide.

2. A machine for testing the accuracy of helical leads, comprising a supporting structure, a spindle mounted rotatably on said supporting structure adapted to be engaged with and rotate a test piece having a surface of helicoidal character, a carriage mounted on said supporting structure movable along the lead of such surface, a drive slide mounted on the supporting structure to move in a path transverse to both the axis of the spindle and the direction of lead, ratio bars in rigid connection with each other mounted to turn about an axis transverse to both of said paths and disposed so that at one point in their rotational movement one bar is perpendicular to the path of said carriage and the other bar perpendicular to the path of said drive slide, abutment members carried by the carriage and drive slide in position to engage the respective ratio bars, said abutment members being adjustable to alter their distances from the axis of rotation of the bars, means operated by said drive slide to impart rotary movement to the spindle when the drive slide is moved, and a feeler member mounted on the carriage disposed to bear on the surface of a test piece.

3. A lead measuring machine comprising a measuring slide mounted to move in a given path, a drive slide mounted to move in a path transverse to that of the measuring slide, two ratio bars in rigid connection to each other mounted to rotate about an axis transverse to the directions of movement of both of said slides and so disposed that in one position one of said bars is perpendicular to the path of the measuring slide and the other is perpendicular to the path of the drive slide, abutment members mounted on the respective slides each in position to engage one of said bars and being adjustable to vary the distance of their respective paths of movement from the axis of rotation of the bars, a spindle mounted with its axis of rotation transverse to the path of the drive slide, a disk secured to said spindle, an idly rotatable disk rotatable about an axis parallel to that of the spindle, a flexible band embracing said disks, and means for imparting linear movement from the drive slide to one of the stretches of said band.

4. A lead measuring machine comprising a measuring slide mounted to move in a given path, a drive slide mounted to move in a path transverse to that of the measuring slide, two ratio bars in rigid connection to each other mounted to rotate about an axis transverse to the directions of movement of both of said slides and so disposed that in one position one of said bars is perpendicular to the path of the measuring slide and the other is perpendicular to the path of the drive slide, abutment members mounted on the respective slides each in position to engage one of said bars and being adjustable to vary the distance of their respective paths of movement from the axis of rotation of the bars, a spindle mounted with its axis of rotation transverse to the path of the drive slide, a disk secured to said spindle, an idly rotatable disk rotatable about an axis parallel to that of the spindle, a flexible band embracing the disk and extending in two stretches from one to the other, and means on the drive slide adapted to make either stretch of the band fast thereto so as to transmit rotary movement to the spindle in either direction when the slide travels in one direction.

5. In a lead measuring machine, a measuring slide constrained to move in a linear path, a ratio bar mounted to swing about an axis transverse to the direction in which said slide is movable, the bar having an active face which is parallel to a radius of said axis and is perpendicular to the path of the slide when the bar is at one point in its swinging movement, an abutment member carried by the slide in position to engage said active face and being adjustable transversely of said axis and of the path of the carriage to vary the distance of its path from said axis, a drive slide mounted to move in directions transverse to the measuring slide, a second ratio bar mounted to swing about the same axis as the first named bar and having an active face parallel to a radius of said axis which is perpendicular to the path of the drive slide at the same time that the active face of the first named bar is perpendicular to the path of the measuring slide, an abutment member carried by the drive slide in engagement with the second ratio bar and being adjustable on the drive slide to vary its distance from the axis, means for turning said bars in unison about their common axis, whereby to cause linear movement of both slides in their respective paths, a rotatable spindle, and means for transmitting angular movement from the drive slide to the spindle.

6. In a lead measuring machine, the combination of a carriage having a feeler thereon, a spindle rotatably mounted adjacent said carriage and adapted to support a work piece for engagement by said feeler, means for rotating the spindle comprising a drive slide movable in directions transverse to the axis of said spindle, a disk carried by the spindle, an idle disk beside the first named disk, a flexible band embracing both disks the space between them, and means on the drive slide for releasably coupling one stretch of the flexible band thereto and means for propelling said drive slide in its prescribed path, whereby said band is displaced linearly and the spindle is rotated.

7. In a lead measuring machine, the combination of a carriage having a feeler thereon, a spindle rotatably mounted adjacent said carriage and adapted to support a work piece for engagement by said feeler, means for rotating the spindle comprising a drive slide guided to move in opposite directions transverse to the axis of said spindle, a disk carried by the spindle, an idle disk beside the first named disk, a flexible band embracing both disks and the space between them, and separate clamping means on the drive slide each adjacent to one of the stretches of the flexible band, either of said clamping means being operable to couple the band to the drive slide.

8. A machine for measuring helical leads and the like, comprising holding means adapted to support and rotate a test piece having a helical surface, a carriage mounted to travel in a path extending along the lead of such helical surface, an indicator mounted on said carriage having a feeler member adapted to be placed in contact with the helical surface, a traveler supported apart from said carriage and guided to move in a path transverse to the axis of rotation of said holding means coupled with said holding means so as to cause rotation of the latter when displaced in its path, a common driving means for said carriage and traveler having force applying elements engaged with the carriage and traveler respectively.

9. A machine according to claim 8, in which the slide and traveler are provided with abutments arranged to receive the pressure of said elements, which abutments are adjustable to vary the extent of movement imparted to the carriage and traveler in consequence of a given movement of the driving means.

10. In a lead measuring machine, the combination of a base, a spindle rotatably mounted on said base, a drive slide supported and guided to move on said base in directions transverse to the axis of the spindle, a carriage supported and guided to move on said base in the general direction of said axis, a disk carried by the spindle, an idle disk beside the first named disk, a flexible band embracing both disks and the space between them, means on the drive slide for releasably coupling one stretch of the flexible band thereto, and driving means engaged with said drive slide and carriage for imparting simultaneous motion thereto.

11. In a lead measuring machine, the combination of a base, a spindle rotatably mounted on said base, a drive slide supported and guided to move on said base in directions transverse to the axis of the spindle, a carriage supported and guided to move on said base in the general direction of said axis, a disk carried by the spindle, an idle disk beside the first named disk, a flexible band embracing both disks and the space between them, separate clamping means on the drive slide each adjacent to one of the stretches of the flexible band and either of them being operable to couple the band to the drive slide, and common driving means for said carriage and slide operable to move both of them simultaneously.

12. A machine for testing the leads of helical surfaces comprising a rotatable spindle adapted to engage and rotate a test piece having a helical surface, an indicating instrument supported with provision for movement along the linear component of such helical surface and having a feeler element disposed to bear against the helical surface, a rotatable driving element, primary propelling means coupled to impart rotation to said element, a plurality of angularly movable transmission members mounted to be propelled rotatably by said rotatable element, and abutments engaged separately with each of said transmission members and connected to transmit angular motion to said spindle and linear motion to the indicating instrument, respectively.

13. A machine according to claim 12, in which the abutments are adjustable to different distances from the centers of angular movement of the transmission members with which they are respectively engaged, whereby to alter the ratio between the angular movement of the spindle and the linear movement of the indicating instrument.

ARTHUR I. BEAN.

REFERENCES CITED

The following references are of record in the file of this patent:

UNITED STATES PATENTS

| Number | Name | Date |
|---|---|---|
| 653,726 | Yarnell | July 17, 1900 |
| 1,846,270 | Olson | Feb. 23, 1932 |
| 2,046,506 | Drader | July 9, 1936 |
| 2,108,414 | Schurr | Feb. 15, 1938 |
| 2,261,093 | Poupitch | Oct. 28, 1941 |
| 2,268,342 | Osplack | Dec. 30, 1941 |